United States Patent
Okamoto

(10) Patent No.: US 7,889,269 B2
(45) Date of Patent: Feb. 15, 2011

(54) IMAGE TAKING DEVICE AND CONTROL METHOD FOR IMAGE TAKING

(75) Inventor: Satoshi Okamoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 444 days.

(21) Appl. No.: 12/021,868

(22) Filed: Jan. 29, 2008

(65) Prior Publication Data

US 2008/0180543 A1 Jul. 31, 2008

(30) Foreign Application Priority Data

Jan. 30, 2007 (JP) ............................. 2007-019961

(51) Int. Cl.
*H04N 5/232* (2006.01)
*G06K 9/00* (2006.01)

(52) U.S. Cl. ...................... 348/345; 382/118

(58) Field of Classification Search ............. 348/333.3, 348/345, 349, 350, 352; 382/103, 118, 190
See application file for complete search history.

(56) References Cited

U.S. PATENT DOCUMENTS

| | | | | |
|---|---|---|---|---|
| 7,298,412 B2* | 11/2007 | Sannoh et al. | ............. | 348/348 |
| 7,542,600 B2* | 6/2009 | Yu et al. | ...................... | 382/167 |
| 7,783,084 B2* | 8/2010 | Imagawa et al. | ............. | 382/118 |
| 2006/0034602 A1 | 2/2006 | Fukui | | |
| 2006/0210264 A1 | 9/2006 | Saga | | |
| 2007/0019943 A1* | 1/2007 | Sueyoshi et al. | ............. | 396/287 |
| 2007/0058869 A1* | 3/2007 | Matsuzaka et al. | .......... | 382/190 |

FOREIGN PATENT DOCUMENTS

| | | |
|---|---|---|
| EP | 1 471 455 A2 | 10/2004 |
| EP | 1 471 455 A3 | 10/2004 |
| EP | 1 628 465 A1 | 2/2006 |
| JP | 2005-159708 | 6/2005 |
| JP | 2006-87083 A | 3/2006 |

* cited by examiner

*Primary Examiner*—Lin Ye
*Assistant Examiner*—Trung Diep
(74) *Attorney, Agent, or Firm*—Birch, Stewart, Kolasch & Birch, LLP

(57) ABSTRACT

For each image data, face information indicating the number of faces of subjects included in an image is added. Further, the percentage of images in which there exist faces is calculated. When the percentage exceeds a face detecting flag threshold, the face detecting flag is set ON. When the percentage does not exceed the face detecting flag threshold, the face detecting flag is set OFF. The face detecting flag is stored in the flash memory portion of the memory. The face detecting flag is read from the flash memory portion of the memory in the shooting mode at the next time. When the face detecting flag is set ON, an image display device displays instructions on prompting a user to make the face detecting function effective.

21 Claims, 12 Drawing Sheets

FIG.9

| IMAGE FILE NAME | FACE DETECTION RESULTS |
|---|---|
| 20061208001 | 1 |
| 20061209001 | 3 |
| 20061209002 | 0 |
| 20061209003 | NOT YET DETECTED |
| 20061209004 | NOT YET DETECTED |
| 20061210001 | 2 |
| 20061210002 | 0 |
| ⋮ | ⋮ |

IMAGE TAKING DEVICE AND CONTROL METHOD FOR IMAGE TAKING

BACKGROUND OF THE INVENTION

1. Field of the Invention

The present invention relates to an image taking device and a control method for image taking, and in particular, to an image taking device and a control method for image taking capable of detecting a face in an image.

2. Description of the Related Art

A technique which detects human faces in photographed images to use the data of the detected faces to various applications has been disclosed. Japanese Patent Application Laid-Open No. 2006-87083 describes a technique which displays warning messages according to results output from an object detecting device or automatically changes the controlling parameters in an imaging unit.

As described in Japanese Patent Application Laid-Open No. 2006-87083, to keep the object detecting device operating all the time causes power consumption required for operation and delay in operation due to a control load, which reduces the number of images that can be photographed and increases discomfort of operation caused for users.

SUMMARY OF THE INVENTION

The present invention has been made in view of the above situations and provides an image taking device which detects faces (determines whether there exists a person) in a recorded image to determine whether an appearance ratio of a face (persons) is high in images photographed by a user. When the appearance ratio is high and a face detecting function is made ineffective, the image taking device prompts a user to make the face detecting function effective at the time of timing on a power supply next time or automatically makes the face detecting function effective.

To achieve the object, an image taking device according to a first aspect of the present invention comprises: an image taking device which picks up an object image and converts the image into image data; a face detecting device which detects whether there exist one or more human faces in the image data; a switching device which manually switches a face detecting function to its effective or its ineffective position; a controlling device, when the face detecting function is switched to its effective position and one or more faces are detected in the image data, which automatically controls at least one of exposure, focus, white balance and picture quality so that the detected faces can be optimally photographed; a recording device which records in a recording medium, face information representing the presence of a face in the image data associated with the image data based on detection result by the face detecting device; a determining device which determines based on the face information, whether a percentage of image data in which there exist one or more faces in the image data recorded in the recording medium exceeds a predetermined threshold; and an instructing device which provides an instruction on prompting a user to switch the face detecting function to its effective position when the determining device determines that the percentage of image data in which there exist faces exceeds the predetermined threshold at the time of turning on a power supply.

Thus, when the percentage of image data in which there exist one or more faces is large in the image data recorded in the recording medium, the image taking device prompts a user to make the face detecting function effective. Thereby it enables to effectively use the face detecting function in accordance with user's taste or preference in shooting images. When the percentage of image data in which there exist one or more faces is small, the user is not prompted to make the face detecting function effective, which does not cause wasteful power consumption, delay in operation due to control load. Therefore, it enables to avoid the reduction of the number of images that can be photographed, and reduces discomfort of operation caused for users.

According to a second aspect of the present invention, in the image taking device according to the first aspect, the instructing device provides instructions on prompting a user to select whether the face detecting function is made effective or ineffective at the time of turning on the power supply when it has determined that the percentage of image data in which one or more faces are detected exceeds the predetermined threshold.

Thus, prompting a user to select whether the face detecting function is made effective or ineffective allows the face detecting function to be effectively used.

To achieve the object, an image taking device according to a third aspect of the present invention comprises: an image taking device which picks up an object image and converts the image into image data; a face detecting device which detects whether there exist one or more human faces in the image data; a switching device which switches a face detecting function to its effective or its ineffective position; a controlling device, when the face detecting function is switched to its effective position and one or more faces are detected in the image data, which automatically controls at least one of exposure, focus, white balance and picture quality so that the detected faces can be optimally photographed; a recording device which records in a recording medium, face information representing the presence of a face in the image data associated with image based on detection result by the face detecting device; and a determining device which determines based on the face information, whether a percentage of image data in which there exist one or more faces in the image data recorded in the recording medium exceeds a predetermined threshold; wherein the switching device automatically switches the face detecting function to its effective position when the determining device determines that the percentage of image data in which there exist one or more faces exceeds the predetermined threshold at the time of turning on a power supply.

Thus, when the percentage of image data in which there exist one or more faces is large in the image data recorded in the recording medium, automatically making the face detecting function effective enables effective use of the face detecting function in accordance with user's taste or preference in shooting images. When the percentage of image data in which there exist one or more faces is small, the face detecting function is automatically made ineffective, which does not cause wasteful power consumption and delay in operation due to control load. Therefore, the reduction of the number of images that can be photographed can be avoided, and thus reducing discomfort of operation caused for users.

According to a fourth aspect of the present invention, in the image taking device according to any of the first to the third aspect, the determining device determines whether the percentage of image data in which there exist one or more faces in the image data which have been photographed within a predetermined period of time from a latest image data exceeds the predetermined threshold.

Thus, checking whether there exist one or more faces in the image data within a predetermined period of time enables effective use of the face detecting function in accordance with user's taste or preference in shooting images within the predetermined period of time.

According to a fifth aspect of the present invention, in the image taking device according to any of the first to the third aspect, the determining device determines whether the percentage of image data in which there exist one or more faces in a predetermined number of image data selected in reverse chronologic order from a latest image data exceeds the predetermined threshold.

Thus, checking whether there exist one or more faces in the predetermined number of the image data selected in reverse chronologic order from a latest image data enables effective use of the face detecting function in accordance with user's recent taste or preference in shooting images.

The recording device preferably records information representing the presence of one or more faces in a header portion of an image file of the image data and the image data in a data portion of the image file.

According to a sixth aspect of the present invention, in the image taking device according to any of the first to the fifth aspect, the recording device records the face information to a header portion of an image file and the image data in a data portion of the image file.

Thus, recording face information into the header portion of the image file and the image data into the data portion of the same image file enables to easily associate the face information with the image data and to record the face information.

According to a seventh aspect of the present invention, in the image taking device according to any of the first to the fifth aspect, the recording device records the face information in a face information file different from an image file storing the image data.

Thus, recording face information into the dedicated face information file different from the image file permits easily calculating the percentage of images in which there exist one or more faces.

To achieve the object, a control method for image taking in a image taking device comprising a switching device which manually switches a face detecting function to its effective or ineffective position, wherein the face detecting function is made ineffective at the time of turning a power supply on, and when the face detecting function is switched to its effective position after the power supply has been set ON and one or more faces are detected in image data to be photographed, to automatically control at least one of exposure, focus, white balance and picture quality so that the detected faces can be optimally photographed, the control method for image taking comprises the steps of: detecting whether there exist one or more faces in all image data recorded in a recording medium or in the image data within a predetermined period of time from a latest image data or in a predetermined number of image data selected from the latest image data; determining a percentage of image data in which there exist one or more faces in all image data detected as to whether there exist the faces; and providing an instruction on prompting a user to switch the face detecting function to its effective position when a percentage of image data in which there exist one or more faces exceeds a predetermined threshold at the time of turning on the power supply.

Thus, when the percentage of image data in which there exist one or more faces is large in the image data recorded in the recording medium, the image taking device prompts a user to make the face detecting function effective. Thereby it enables to effectively use the face detecting function in accordance with user's taste or preference in shooting images. When the percentage of image data in which there exist one or more faces is small, the user is not prompted to make the face detecting function effective, which does not cause wasteful power consumption, delay in operation due to control load. Therefore, it enables to avoid the reduction of the number of images that can be photographed, and reduces discomfort of operation caused for users.

To achieve the object, a control method for image taking according to a ninth aspect of the present invention, when a face detecting function is switched to its effective position and one or more faces are detected in image data to be photographed, automatically controlling at least one of exposure, focus, white balance and picture quality so that the detected faces can be optimally photographed, the control method for image taking comprising the steps of: detecting whether there exist one or more faces in all image data recorded in a recording medium or in image data within a predetermined period of time from a latest image data or in the predetermined number of image data selected in reverse chronologic order from the latest image data; determining the percentage of image data in which there exist one or more faces to all image data detected as to whether there exist the faces; and making the face detecting function effective when the percentage of image data in which there exist one or more faces exceeds a predetermined threshold at the time of turning on a power supply.

Thus, when the percentage of image data in which there exist one or more faces is large in the image data recorded in the recording medium, the image taking device prompts a user to make the face detecting function effective. Thereby it enables to effectively use the face detecting function in accordance with user's taste or preference in shooting images. When the percentage of image data in which there exist one or more faces is small, the user is not prompted to make the face detecting function effective, which does not cause wasteful power consumption, delay in operation due to control load. Therefore, it enables to avoid the reduction of the number of images that can be photographed, and reduces discomfort of operation caused for users.

According to the present invention, when the percentage of image data in which there exist one or more faces is large in the image data recorded in the recording medium, prompting a user to make the face detecting function effective or automatically making the face detecting function effective. This makes it possible to effectively use the face detecting function in accordance with user's taste or preference in shooting images. When the percentage of image data in which there exist one or more faces is small, a user is not prompted to make the face detecting function effective or the face detecting function is not automatically made effective, which does not cause wasteful power consumption and delay in operation due to control load. Therefore, it enables to avoid the reduction of the number of images that can be photographed, and reduces discomfort of operation caused for users.

BRIEF DESCRIPTION OF THE DRAWINGS

FIG. 9 is table visualizing the content of the file in the face information file;

DETAILED DESCRIPTION OF THE PREFERRED EMBODIMENTS

Preferred embodiments of the image taking device according to the present invention are described below with reference to the accompanying drawings.

First Embodiment

Figure 1:
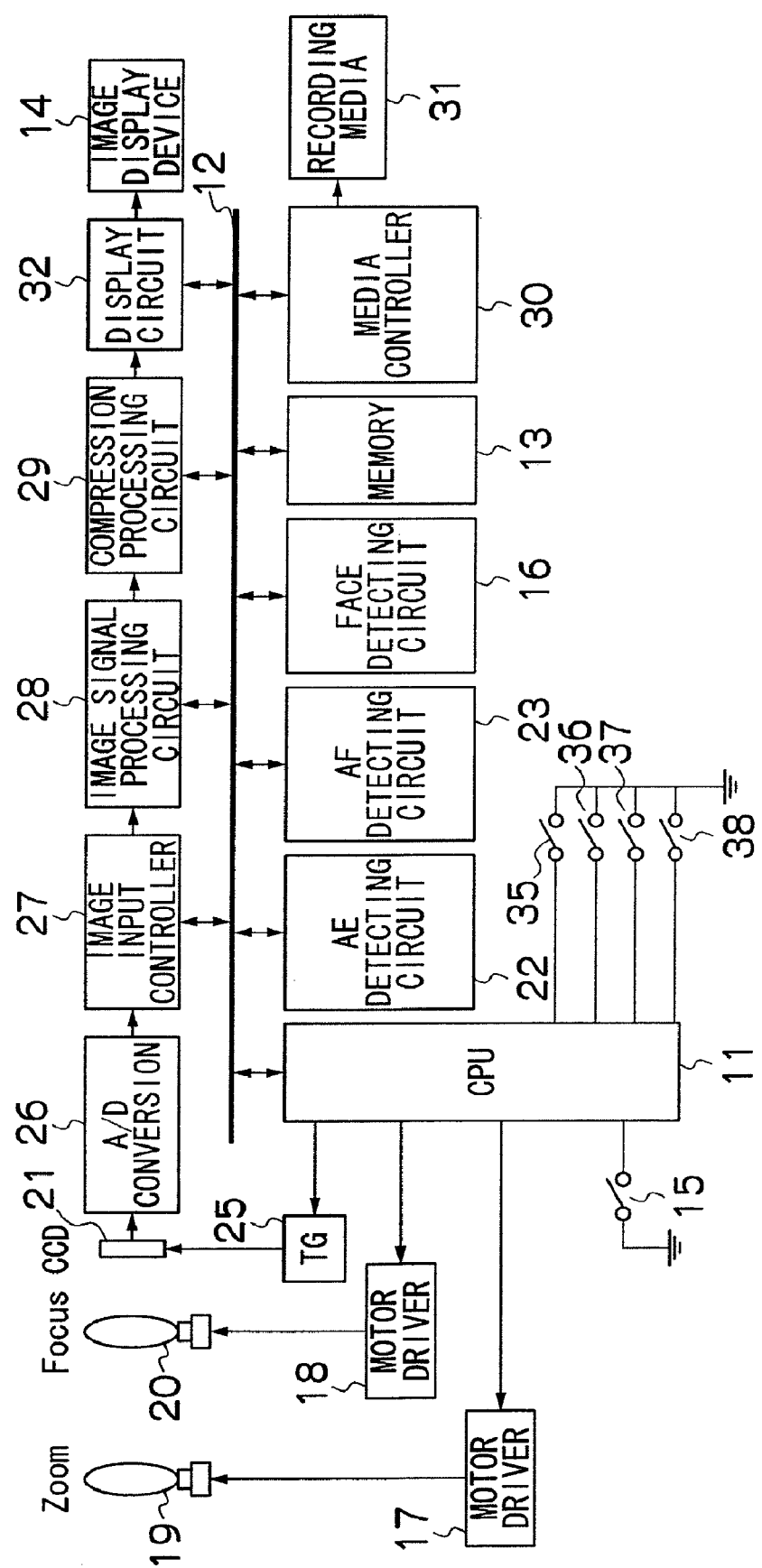
FIG. 1 is a block diagram illustrating one example of an internal configuration of a digital camera 1 of the first embodiment according to the present invention.

FIG. 1 is a block diagram illustrating one example of an internal configuration of a digital camera 1 of a first embodiment according to the present invention.

In the figure, a CPU 11 overall controls each circuit in the digital camera 1 based on inputs from various operational switches and executes process in accordance with camera controlling programs.

The CPU 11 controls each circuit through a BUS 12. The CPU 11 sends and receives required data to and from a memory 13. The inside of the memory 13 is separated into a ROM, a RAM and a flash memory area. The ROM area stores a camera controlling program, an opening image at the time of booting, an ending image at the time of stopping, a GUI image such as a menu image used for the operation of the digital camera 1, an image used for a screen saver, an image displaying progress in process (such as an image of a sandglass whose scale changes), key-operation sound such as shutter sound and the like, and sound data representing alarm sound and error sound.

When a power supply is set ON, the CPU 11 detects that the power supply has been set ON, turns on the power supply of the camera and displays for a certain period the opening image stored in the ROM area of the memory 13, and then turns the camera to a shooting standby state in a shooting mode. The CPU 11 causes an image display device 14 to display a moving image or a through-the-lens image (live view image, or pass-though image) in the shooting standby state.

A camera user (or a shooter) frames a picture while viewing the through-the-lens image displayed on the image display device 14, confirms an object which he or she wants to shoot or a shot image or sets imaging conditions.

Figure 2:
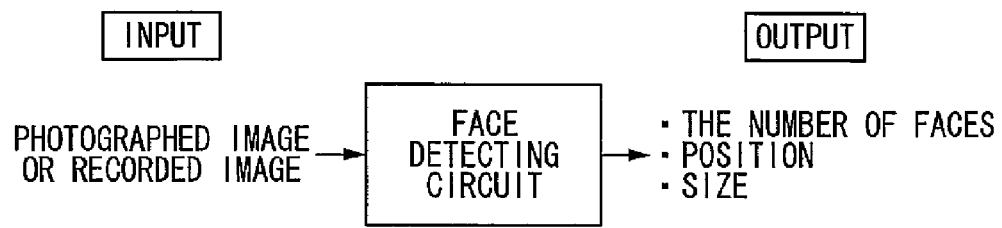
FIG. 2 is a schematic diagram of the face detecting circuit 16.

When a face detecting function switch 36 is depressed to make a face detecting function effective in the shooting standby state, a face detecting circuit 16 detects faces in an object image and causes the image display device 14 to display the detected face with a frame. FIG. 2 is a schematic diagram of the face detecting circuit 16. The face detecting circuit 16 receives image data of an object image imaged on the light receiving surface of the CCD 21 or image data stored in the recording medium 31, analyzes these image data to detect human faces and outputs the number of the detected faces, the position and the size of each face.

AE and AF detecting circuits 22 and 23 are described below.

Figure 3:
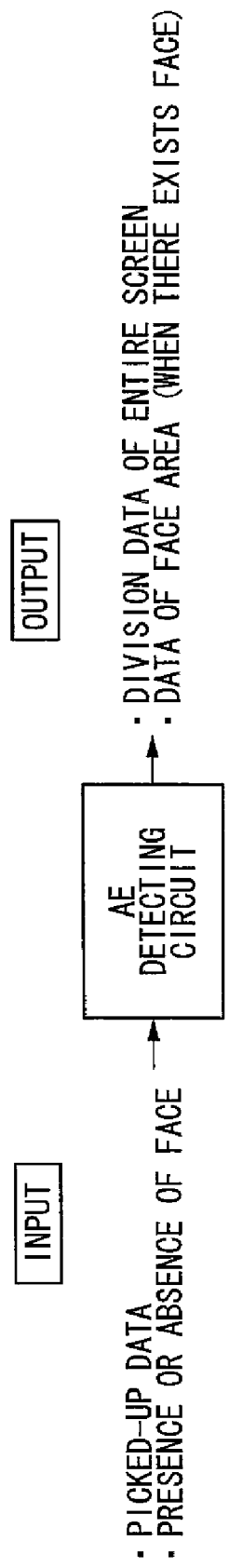
FIG. 3 is a schematic diagram of the AE detecting circuit 22.

FIG. 3 is a schematic diagram of the AF detecting circuit 22. The AF detecting circuit 22 receives image data of an object image imaged on the light receiving surface of the CCD 21 and data as to whether there exist faces, which is the output from the face detecting circuit 16, and outputs divided data of luminance of the entire screen and data on luminance of faces when the face detecting circuit 16 detects faces.

Figure 4:
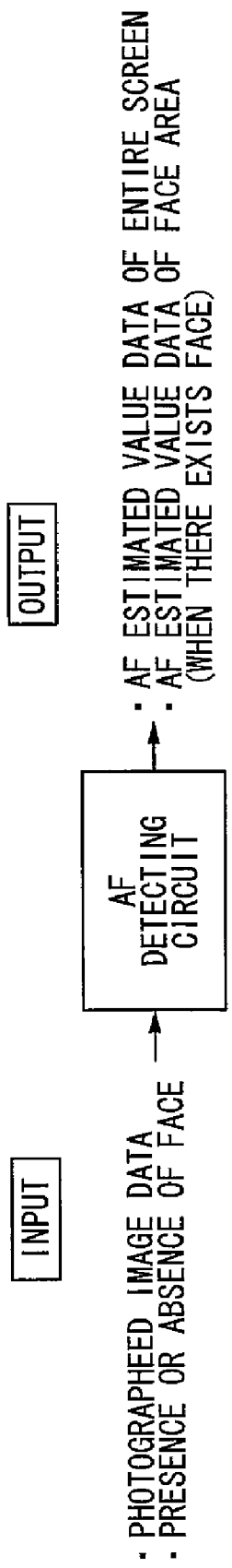
FIG. 4 is a schematic diagram of the AF detecting circuit 23.

FIG. 4 is a schematic diagram of the AF detecting circuit 23. The AF detecting circuit 23 calculates an integrated value of high frequency components from object-image data imaged on the light receiving surface of a CCD 21 in each position of a focus lens 20 which is changed as the AF detecting circuit 23 drives the focus lens 20 through a focus motor driver 18 and outputs the integrated value as an AF estimated value. The AF estimated value is typically calculated at the center portion of the screen. However, the AF detecting circuit 23 outputs the AF estimated value on the face when the face detecting circuit 16 detects faces.

When a release button 15 is depressed in the shooting standby state, the CPU 11 performs focus control, photometry and exposure control to drive a zoom lens 19 and a focus lens 20 through a zoom motor-driver 17 and a focus motor-driver 18 based on results detected by the AE and the AF detecting circuit 22 and 23 and images the object image on the light receiving surface of the CCD 21 through these lenses.

The CCD 21 converts the object image imaged on the light receiving surface into signal electric charges according to the quantity of light of the object image. The signal electric charges are read to a shift register by a read gate pulse applied by a timing generator 25 and sequentially read by a register transfer pulse as a voltage signal according to the signal electric charge.

Analog R, G and B signals being the voltage signals output from the CCD 21 are converted into digital R, G and B signals by an A/D converter 26. The digital R, G and B signals are temporarily stored in the RAM area of the memory 13 by an image input controller 27.

An image signal processing circuit 28 reads raw R, G and B data stored in the RAM area of the memory 13, applies a digital gain according to the kinds of light sources to the original R, G and B data to adjust a white balance and perform gamma (gradation conversion) processing, contour correction processing and sharpness processing to generate R, G and B signals. Furthermore, the image signal processing circuit 28 performs YC signal processing to generate a luminance signal Y and chroma signals Cr and Cb (YC signals) and stores the signals again in the RAM area of the memory 13 after noise reduction processing.

Figure 5:
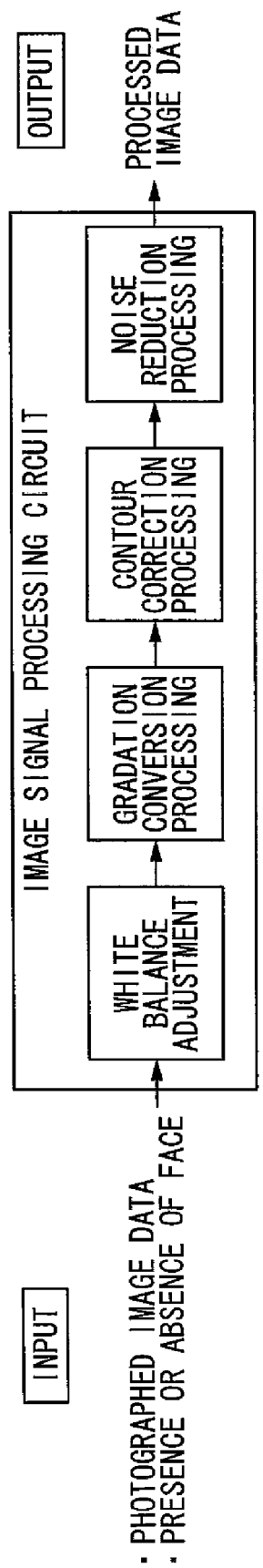
FIG. 5 is a schematic diagram of an image signal processing circuit 28.

FIG. 5 is a schematic diagram of the image signal processing circuit 28. The image signal processing circuit 28 receives image data and data as to whether there exist faces and performs white-balance adjustment, gradation conversion processing, contour correction processing and noise reduction processing to output the processed image data. In the case where the face detecting circuit 16 detects faces, the image signal processing circuit 28 performs the above processings with use of parameters which enable to provide optimum picture quality for the detected faces.

The YC signals thus stored in the RAM area of the memory 13 are compressed by a compression processing circuit 29 into a predetermined format and then recorded in a recording medium 31 detachable to the digital camera 1 through a media controller 30.

When a reproducing mode is selected by operating a mode switch 35, an image file of the latest frame stored in the recording medium 31 is read out through the media controller 30. The compressed data of the read image file is expanded into a non-compressed YC signal through the compression processing circuit 29.

The expanded YC signal is converted to a signal format for display by a display circuit 32 and output to the image display device 14. This displays the image of the latest frame recorded in the recording media 31 on the image display device 14.

Figure 6:
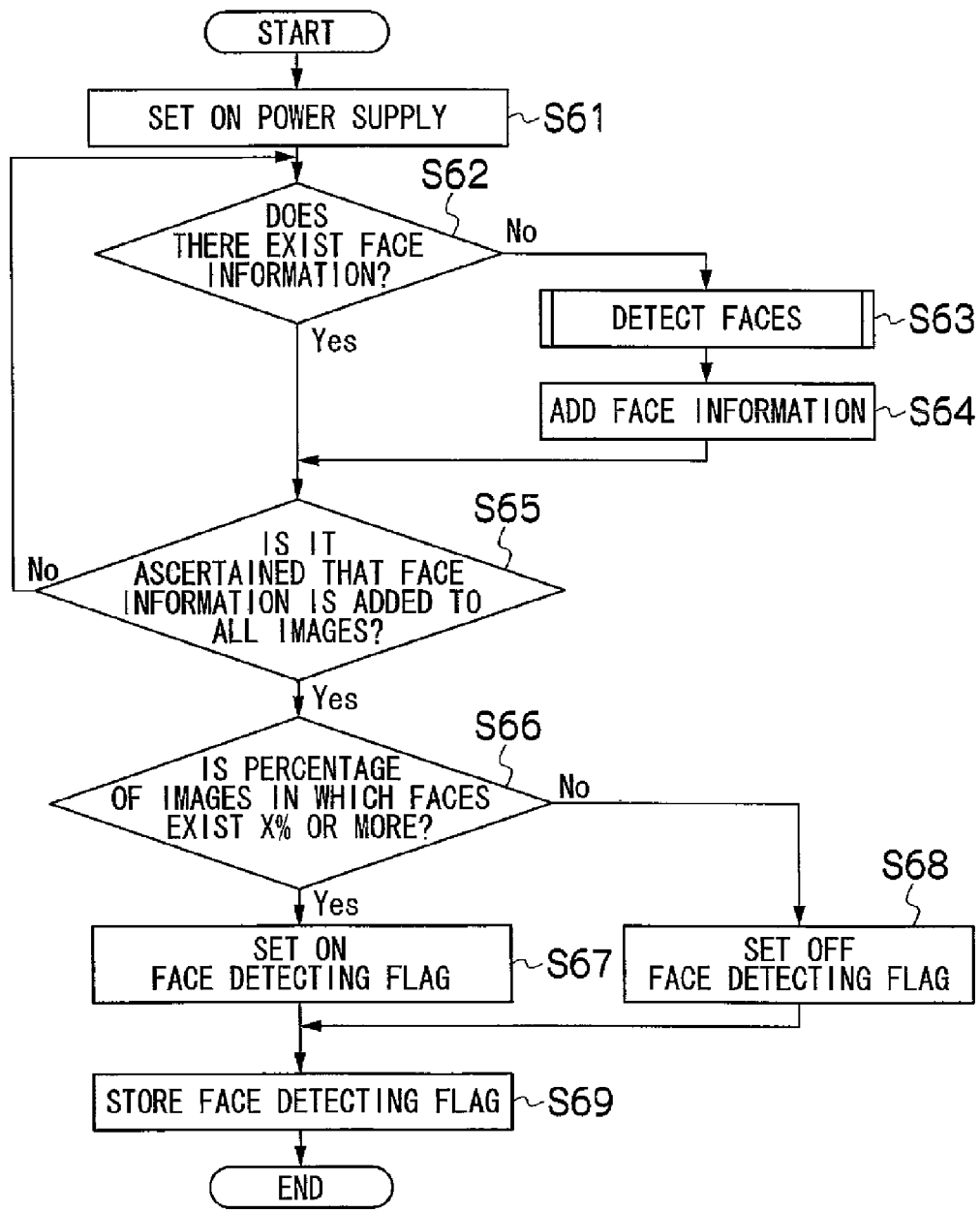
FIG. 6 is a flow chart illustrating the operation of the digital camera 1 of the first embodiment in a reproducing mode.
Figure 7:
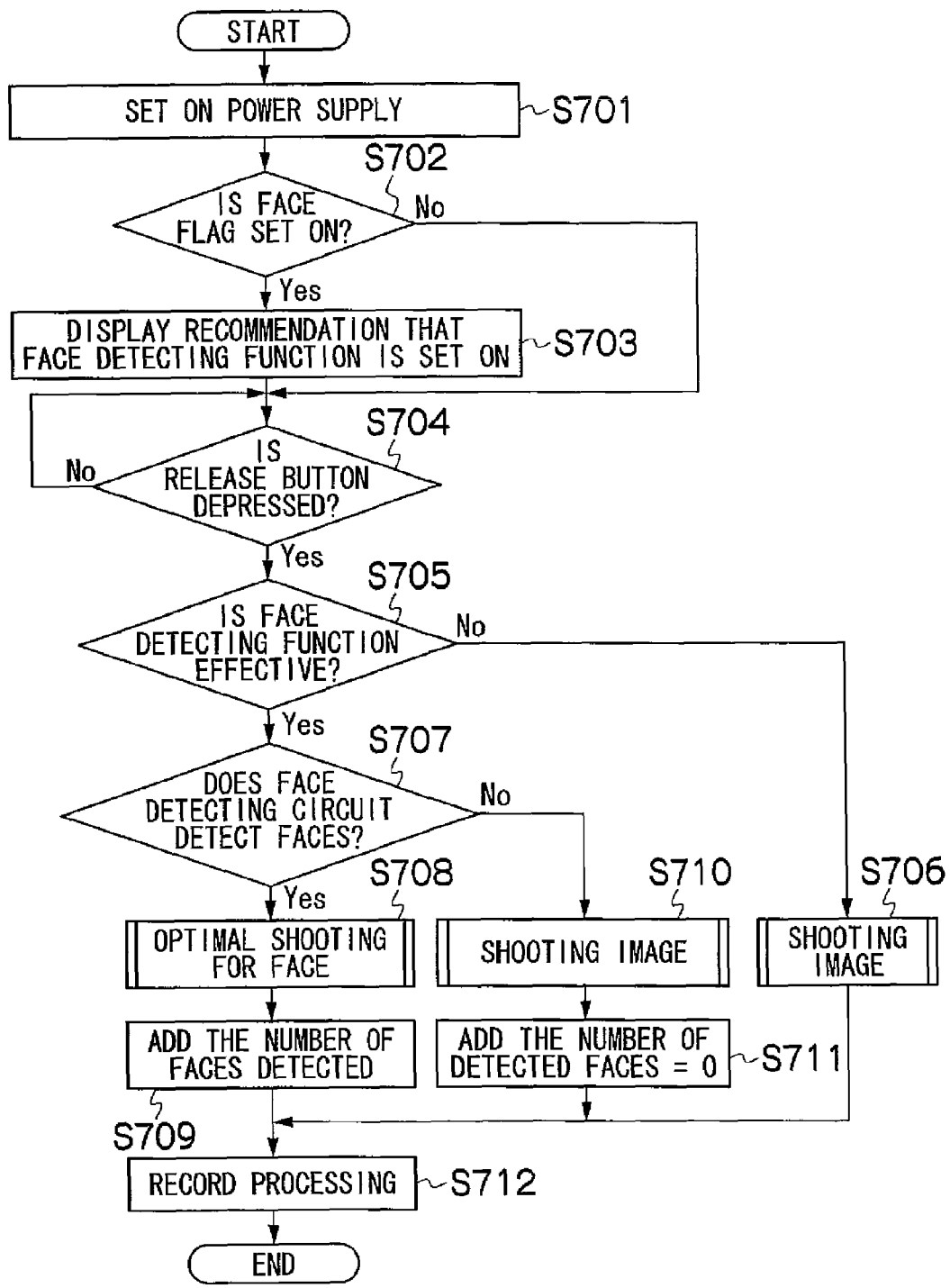
FIG. 7 is a flow chart illustrating the operation of the digital camera 1 of the first embodiment in a shooting mode.

Instructions on prompting a user to switch the face detecting function to its effective position in the digital camera 1 are described with reference to FIGS. 6 to 8. The digital camera 1 of the first embodiment according to the present invention calculates the percentage of images in which faces are detected in the images recorded in the recording media 31 and issues instructions for prompting a user to select as to whether the face detecting function is made effective or ineffective when image data in which faces are detected are larger in amount.

The operation of the digital camera 1 in a reproducing mode is described first. FIG. 6 is a flow chart illustrating the operation of the digital camera 1 in a reproducing mode.

When the power supply of the digital camera 1 is set ON (step S61), the CPU 11 ascertains whether there exists face information for all images stored in the recording media 31 (steps S62 to S65). Here, the face information indicates the number of faces existing in an image data with which the face information is associated. The digital camera 1, as described later, records face information for the photographed image to the recording media 31 with the face information added to the tag of header portion of the image file when the digital camera 1 photographs the image with the face detecting function made effective. On the other hand, when the digital camera 1 photographs an image with the face detecting function made ineffective, face information for the photographed image is not added to the tag, thus, there may exist images to which the face information is not added in the images in the recording media 31.

When images to which the face information is not added are detected, faces are detected from the image data (step S63), the detected result is recorded as face information in a predetermined tag provided on the header portion of the image file (step S64).

When the CPU 11 finishes ascertaining that the face information is added to all images in the recording media 31 (step S65), the percentage of images in which there exist faces in the images in the recording media 31 is calculated to be compared with a face detecting flag threshold (60%) (step S66).

When the percentage of images in which there exist faces is 60% or more, the face detecting flag is set ON (step S67). On the other hand, when the percentage of images in which there exist faces is less than 60%, the face detecting flag is set OFF (step S68). The face detecting flag is stored in the flash memory portion of the memory 13 (step S69).

The operation of the digital camera 1 in a shooting mode is described below with FIG. 7. FIG. 7 is a flow chart illustrating the operation of the digital camera 1 in the shooting mode.

When the power supply of the digital camera 1 is set ON (step S701), the CPU 11 makes the face detecting function ineffective and then checks the face detecting flag stored in the flash memory portion of the memory 13 (step S702).

When the face detecting flag is set ON, the CPU 11 performs a display which recommends a user to use the face detecting function on the image display device 14 (step S703).

Figure 8:
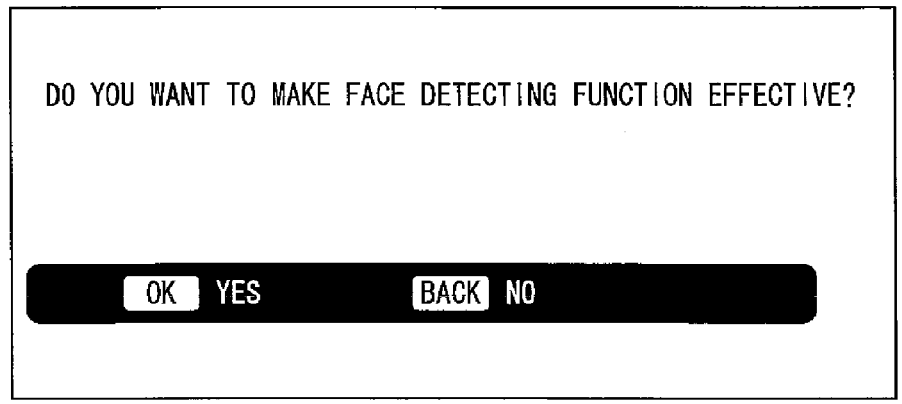
FIG. 8 is a picture illustrating the image display device 14 which provides instructions on prompting a user to select whether the face detecting function is made effective or ineffective.

FIG. 8 is a drawing illustrating the image display device 14 which provides instructions on prompting a user to select whether the face detecting function is made effective or ineffective. During the display of the instructions, user depressing an OK button 37 makes the face detecting function effective. User depressing a BACK button 38 makes the face detecting function ineffective.

When the face detecting flag is set OFF or when a user depressing the OK button 37 or the BACK button 38 while the image display device 14 provides instructions on prompting the user to select whether the face detecting function is made effective or ineffective, the camera turns to a shooting standby state to monitor whether the release button 15 is depressed or not (step S704). When the release button 15 is depressed, whether the face detecting function is effective is determined (step S705).

When the face detecting function is ineffective, shooting is performed (step S706), photographed image data is recorded in the recording media 31 through the media controller 30 (step S712).

When the face detecting function is effective, a determination is made as to whether the face detecting circuit 16 detects faces (step S707).

When the face detecting circuit 16 detects faces in the photographed image, the CPU 11 controls the AE and the AF detecting circuit 22 and 23 to make the detected faces optimally photographed. In a signal processing of the photographed image data, the CPU 11 also controls the image signal processing circuit 28 to adjust white balance and reduce noise (step S708) to obtain an optimum image of the faces. The CPU 11 adds the number of the faces detected by the face detecting circuit 16 as face information to tags (step S709) and performs record processing (step S712).

When the face detecting circuit 16 does not detect faces in the photographed image, a normal shooting is performed (step S710). The CPU 11 adds the number of the detected faces=0 as face information to tags (step S711) and performs record processing (step S712).

Thus, when the power supply is set ON, the face detecting flag stored in the flash memory portion of the memory 13 is read to determine whether to provide instructions for prompting a user to switch the face detecting function to its effective position, thereby the face detecting function can be effectively used according to user's taste for shooting images. When a shooting is performed with the face detecting function made effective, the number of the detected faces is added to tags as face information and recorded, which enables determining whether the face detecting flag is set ON or OFF in the reproducing mode in a short period of time.

Although the face-detecting flag threshold at which instructions are provided on prompting a user to select whether the face detecting function is made effective or ineffective is assumed to be 60% in the present embodiment, but not limited to this value, or may be other values.

In the present embodiment, when the face detecting flag is set ON, although instructions on prompting a user to select whether the face detecting function is made effective or ineffective are provided through a display on the image display device 14, instructions may be provided by speech.

In the present embodiment, although face information is recorded in a predetermined tag provided on the header portion of the image file, a face information file may be provided to record only face information of all image files.

FIG. 9 is a table visualizing the inside of the file in the face information file. The file records the image file name in the recording media 31 and the number of faces being the face detecting results in the respective image files. The digital camera 1 reads the face information file in the reproducing mode to determine whether an image is photographed with the face detecting function performed. In addition, the digital camera 1 detects faces in the image, stores the detected result in the face information file to enable easily calculating the percentage of images in which there exist faces.

Second Embodiment

The digital camera 1 of a second embodiment according to the present invention calculates the percentage of images in which faces are detected to the image recorded in the recording media 31 and automatically makes the face detecting function effective when the number of the image data in which faces are detected is large.

Figure 10:
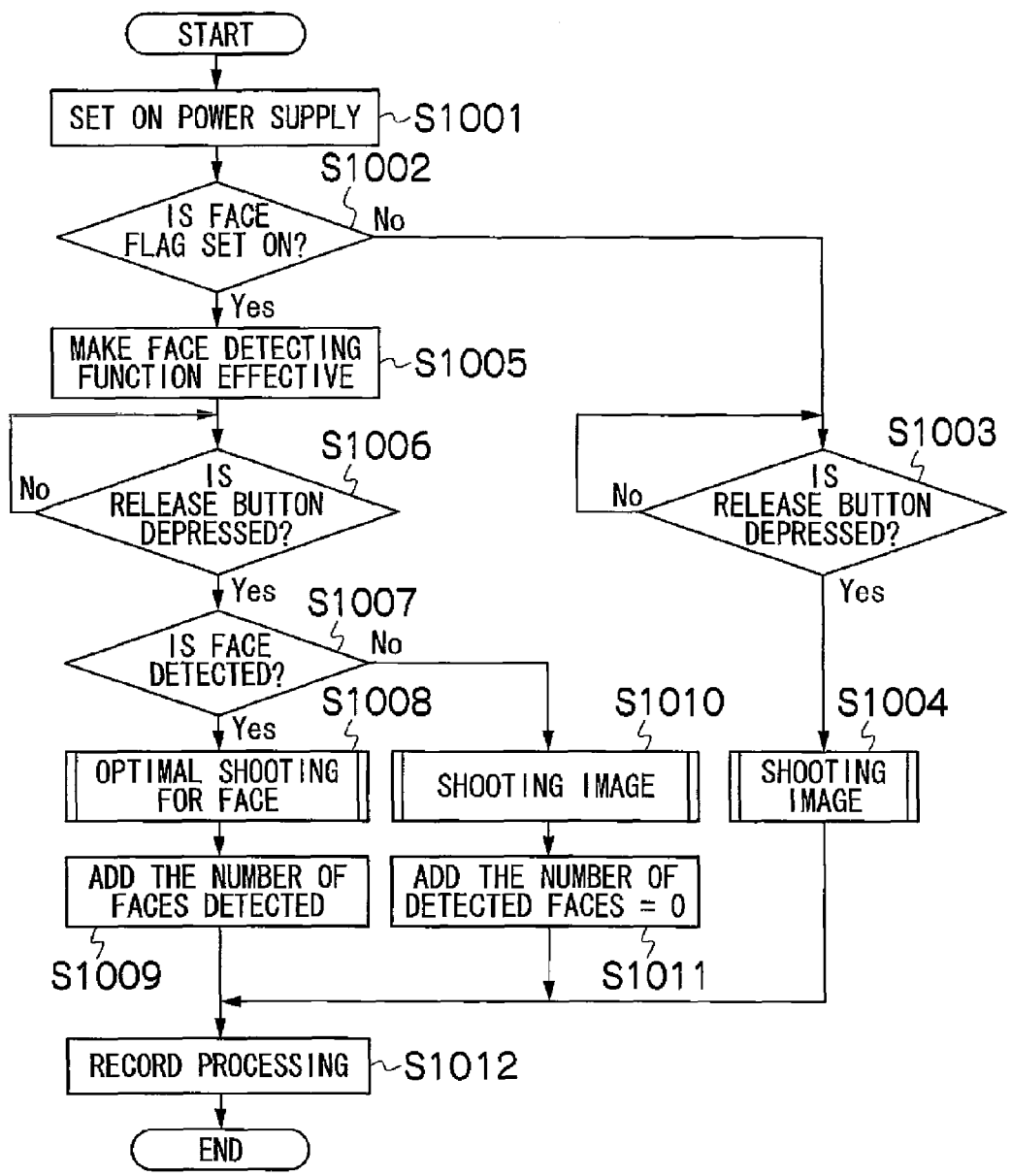
FIG. 10 is a flow chart illustrating the operation of the digital camera 1 of the second embodiment in a shooting mode.

FIG. 10 is a flow chart illustrating the operation of the digital camera 1 in a shooting mode.

When the power supply of the digital camera 1 is set ON (step S1001), the CPU 11 makes the face detecting function ineffective and then checks to see if the face detecting flag stored in the flash memory portion of the memory 13 is set ON or OFF (step S1002).

When the face detecting flag is set OFF, the camera 1 is turned to the shooting standby state with the face detecting function made ineffective (step S1003). After that, depressing the release button 15 performs shooting (step S1004). The photographed image data is recorded in the recording media 31 through the media controller 30 (step S1012).

When the face detecting flag is set ON, the camera 1 is turned to the shooting standby state (step S1006) with the face detecting function automatically made effective (step S1005). After that, when the release button 15 is depressed, whether the face detecting circuit 16 detects one or more faces in an image is determined (step S1007).

When the face detecting circuit 16 detects one or more faces in the image, the CPU 11 controls the AE and the AF detecting circuit 22 and 23 to optimally photograph the detected faces. In a signal processing of the photographed image data, the CPU 11 also controls the image signal processing circuit 28 to adjust white balance and reduce noise (step S1008) to optimize the image of the faces. The CPU 11 adds the number of the faces detected by the face detecting circuit 16 as face information to tags (step S1009) and records them into recording media 31 through the media controller 30 (step S1012).

When the face detecting circuit 16 does not detect faces in the photographed image, a normal shooting is performed (step S1010). The CPU 11 adds the number of the detected faces=0 as face information to tags (step S1011) and performs record processing (step S1012).

Thus, when the power supply is set ON, the face detecting flag stored in the flash memory portion of the memory 13 is read to determine whether to automatically make the face detecting function effective, thereby the face detecting function can be effectively used according to user's preference for shooting images.

Third Embodiment

Figure 11:
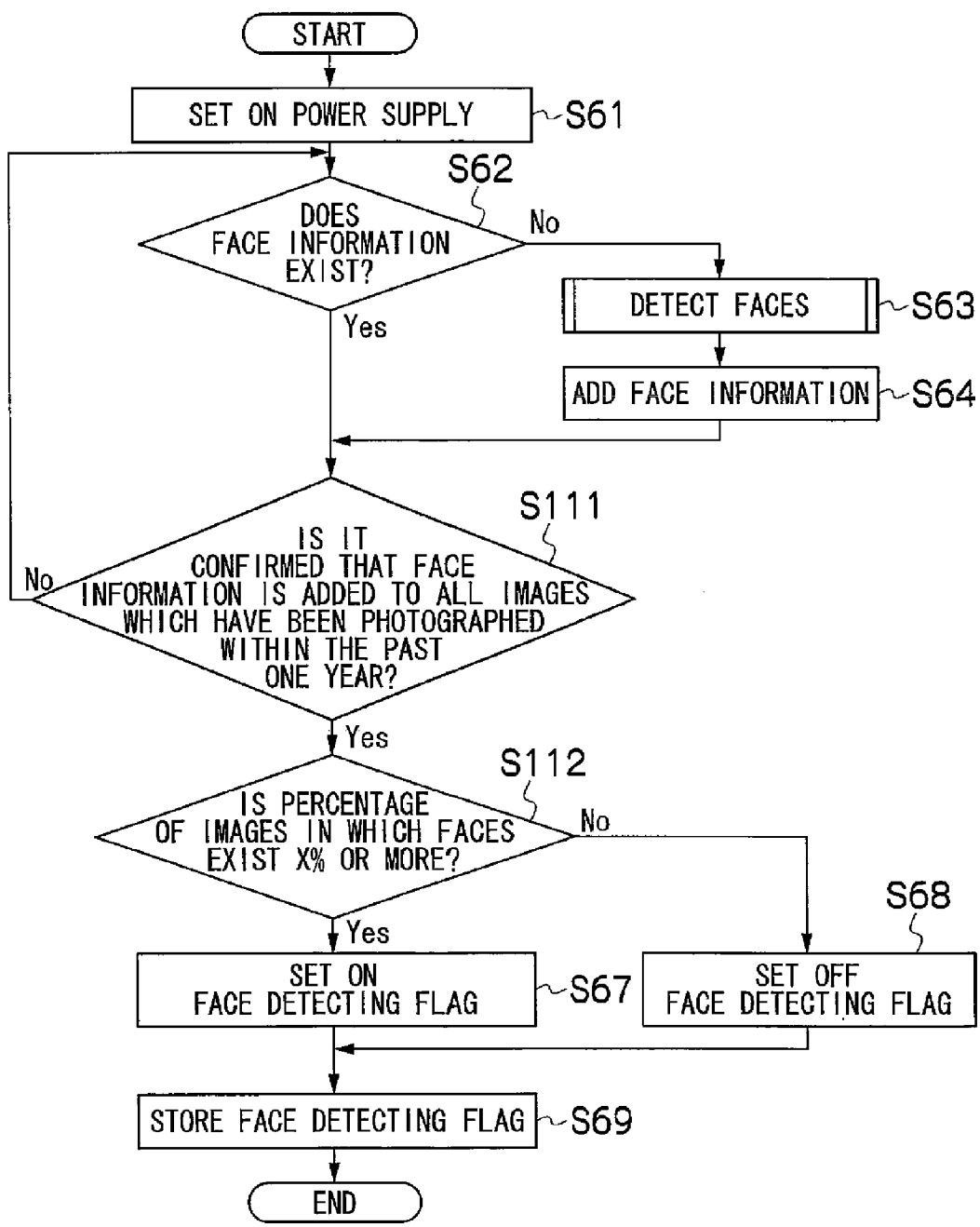
FIG. 11 is a flow chart illustrating the operation of the digital camera 1 of the third embodiment in the reproducing mode.

FIG. 11 is a flow chart illustrating the operation of the digital camera 1 of a third embodiment in the reproducing mode. The portions common to the flow chart illustrated in FIG. 6 are provided with the same reference characters and numbers, and descriptions thereof are omitted.

The operation of the digital camera 1 of the third embodiment in the reproducing mode is different from that of the first embodiment in that a determination is made as to whether the face detecting flag is set ON or OFF in the image in the recording media 31 photographed within the last predetermined period of time.

As is the case with the first embodiment, when the power supply is set ON (step S61), it is detected whether face information is added to image data for each of the images which have been photographed and recorded in the recording media 31 within the past one year (step S62). Incidentally, the date and time on which image was photographed is read from the tag information of the image file. For each of the images to which face information is not added, face detection is performed and face information is generated based on the face detection result (step S63). The face information is stored in the tag of the header portion of the image file of each of the image (step S64).

When it is confirmed that face information is added to each of the images which have been photographed within the past one year (step S111), the percentage of images in which there exist faces in the images which have been photographed within the past one year is calculated. When the percentage of the images in which there exist faces is 60% or more, the face detecting flag is set ON. When the percentage of the images in which there exist faces is less than 60%, the face detecting flag is set OFF. The face detecting flag is recorded in the flash memory portion of the memory 13 (step S112).

Thus, calculating the percentage of images in which there exist faces to the images which have been photographed within the last predetermined period of time allows a user to effectively use the face detecting function within a predetermined period of time according to user's taste or preference.

Although the predetermined period of time is assumed to be the last one year in the present embodiment, but not limited to this period, or several months or years. The period of time may be set at user's discretion.

Fourth Embodiment

Figure 12:
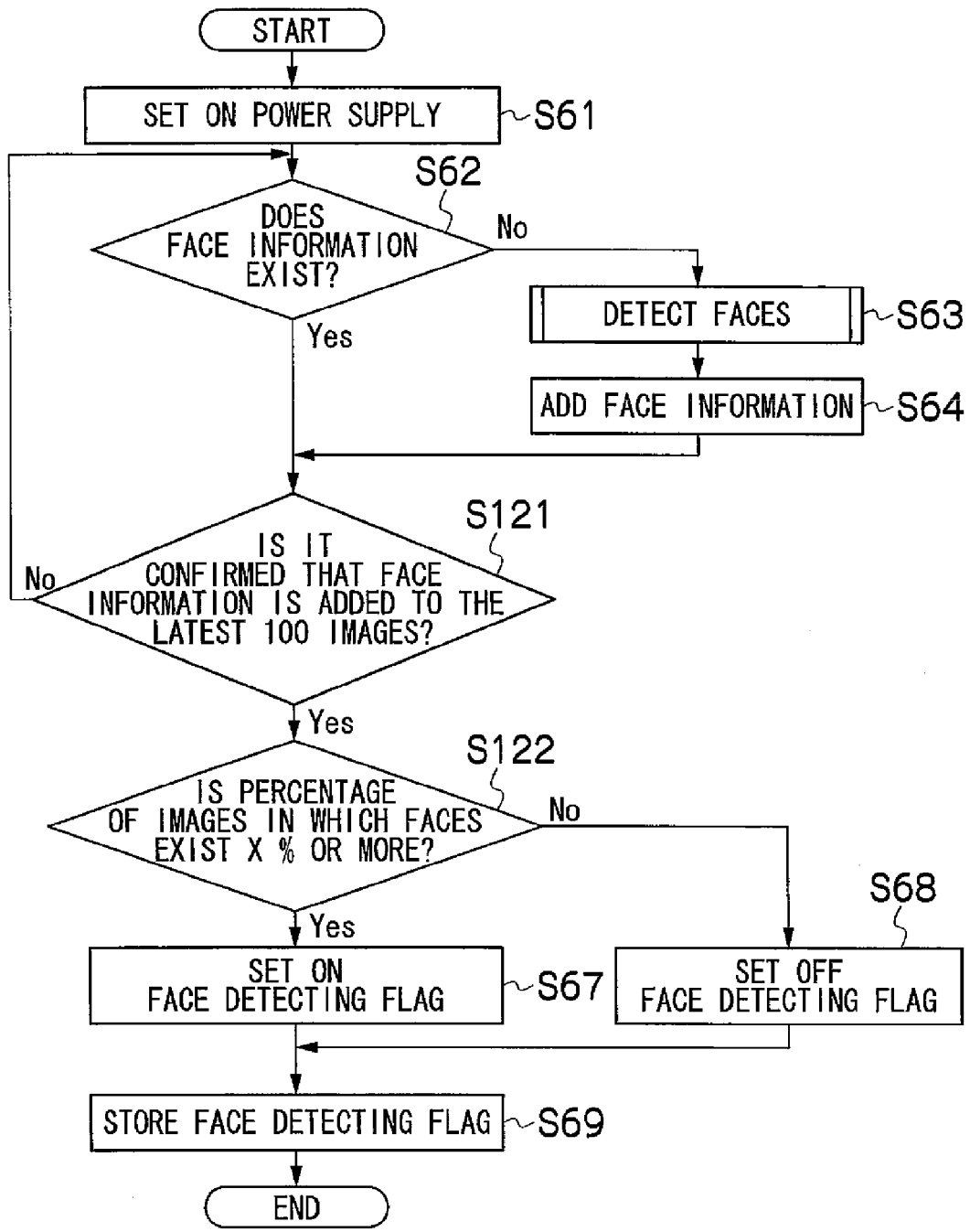
FIG. 12 is a flow chart illustrating the operation of the digital camera 1 of the fourth embodiment in the reproducing mode.

FIG. 12 is a flow chart illustrating the operation of the digital camera 1 of a fourth embodiment in the reproducing mode. The portions common to the flow chart illustrated in FIG. 6 are provided with the same reference characters and numbers, and descriptions thereof are omitted.

The operation of the digital camera 1 of the fourth embodiment in the reproducing mode is different from that of the first embodiment in that a determination is made as to whether the face detecting flag is set ON or OFF in the predetermined number of images in the recording media 31, which are selected in reverse chronologic order of shooting date and time. That is, the predetermined number of images are selected by shooting date and time from the latest one from the images recorded in the recording media 31.

As is the case with the first embodiment, when the power supply is set ON (step 861), it is detected whether face information is added to image data for each of 100 images in the recording media 31, which are selected in reverse chronologic order from the latest shooting date and time (step S62). Incidentally, as for the shooting date and time, the tag information of the image file is used as is the case with the third embodiment. For each of the images to which face information is not added, face detection is performed and face information is generated based on the face detection result (step S63). The face information is stored in the tag of the header portion of an image file of each image (step S64).

When it is confirmed that whether face information is added for each of the 100 images selected in reverse chronologic order from the latest shooting date and time (step S121), the percentage of images in which there exist one or more faces in the 100 images selected in reverse chronologic order from the latest shooting date and time is calculated. When the percentage of the images in which there exist faces is 60% or more, the face detecting flag is set ON. When the percentage of the images in which there exist faces is less than 60%, the face detecting flag is set OFF. The face detecting flag is recorded in the flash memory portion of the memory 13 (step S122).

Thus, calculating the percentage of images in which there exist faces in the predetermined number of images selected in reverse chronologic order of shooting date and time allows a user to effectively use the face detecting function according to the shooting preference of the user in the predetermined number of images selected in reverse chronologic order of shooting date and time.

Although the number of images selected in reverse chronologic order of shooting date and time is assumed to be 100, but not limited to this number. The number of images may be set at user's discretion.

What is claimed is:

1. An image taking device comprising:
   an image taking device which picks up an object image and converts the image into image data;
   a face detecting device which detects whether there exist one or more human faces in the image data;
   a switching device which switches a face detecting function to its effective or its ineffective position;
   a controlling device, when the face detecting function is switched to its effective position and one or more faces are detected in the image data, which automatically controls at least one of exposure, focus, white balance and picture quality so that the detected faces can be optimally photographed;
   a recording device which records in a recording medium, face information representing the presence of a face in the image data associated with the image data based on detection result by the face detecting device;
   a determining device which determines based on the face information, whether a percentage of image data in which there exist one or more faces in the image data recorded in the recording medium exceeds a predetermined threshold; and
   an instructing device which provides an instruction on prompting a user to switch the face detecting function to its effective position when the determining device determines that the percentage of image data in which there exist faces exceeds the predetermined threshold at the time of turning on a power supply.

2. The image taking device according to claim 1, wherein the determining device determines whether the percentage of image data in which there exist one or more faces in the image data which have been photographed within a predetermined period of time from a latest image data exceeds the predetermined threshold.

3. The image taking device according to claim 1, wherein the determining device determines whether the percentage of image data in which there exist one or more faces in a predetermined number of image data selected in reverse chronologic order from a latest image data exceeds the predetermined threshold.

4. The image taking device according to claim 1, wherein the recording device records the face information to a header portion of an image file and the image data in a data portion of the image file.

5. The image taking device according to claim 1, wherein the recording device records the face information in a face information file different from an image file storing the image data.

6. The image taking device according to claim 1, wherein the instructing device provides instructions on prompting a user to select whether the face detecting function is made effective or ineffective at the time of turning on the power supply when it has determined that the percentage of image data in which one or more faces are detected exceeds the predetermined threshold.

7. The image taking device according to claim 6, wherein the determining device determines whether the percentage of image data in which there exist one or more faces in the image data which have been photographed within a predetermined period of time from a latest image data exceeds the predetermined threshold.

8. The image taking device according to claim 6, wherein the determining device determines whether the percentage of image data in which there exist one or more faces in a predetermined number of image data selected in reverse chronologic order from a latest image data exceeds the predetermined threshold.

9. The image taking device according to claim 6, wherein the recording device records the face information to a header portion of an image file and the image data in a data portion of the image file.

10. The image taking device according to claim 6, wherein the recording device records the face information in a face information file different from an image file storing the image data.

11. An image taking device comprising:
    an image taking device which picks up an object image and converts the image into image data;
    a face detecting device which detects whether there exist one or more human faces in the image data;
    a switching device which switches a face detecting function to its effective or its ineffective position;
    a controlling device, when the face detecting function is switched to its effective position and one or more faces are detected in the image data, which automatically controls at least one of exposure, focus, white balance and picture quality so that the detected faces can be optimally photographed,
    a recording device which records in a recording medium, face information representing the presence of a face in the image data associated with image based on detection result by the face detecting device; and
    a determining device which determines based on the face information, whether a percentage of image data in which there exist one or more faces in the image data recorded in the recording medium exceeds a predetermined threshold; wherein
    the switching device automatically switches the face detecting function to its effective position when the determining device determines that the percentage of image data in which there exist one or more faces exceeds the predetermined threshold at the time of turning on the power supply.

12. The image taking device according to claim 11, wherein
the recording device records the face information to a header portion of an image file and the image data in a data portion of the image file.

13. The image taking device according to claim 11, wherein
the recording device records the face information in a face information file different from an image file storing the image data.

14. The image taking device according to claim 11, wherein
the determining device determines whether the percentage of image data in which there exist one or more faces in the image data which have been photographed within a predetermined period of time from a latest image data exceeds the predetermined threshold.

15. The image taking device according to claim 14, wherein
the recording device records the face information to a header portion of an image file and the image data in a data portion of the image file.

16. The image taking device according to claim 14, wherein
the recording device records the face information in a face information file different from an image file storing the image data.

17. The image taking device according to claim 11, wherein
the determining device determines whether the percentage of image data in which there exist one or more faces in a predetermined number of image data selected in reverse chronologic order from a latest image data exceeds the predetermined threshold.

18. The image taking device according to claim 17, wherein
the recording device records the face information to a header portion of an image file and the image data in a data portion of the image file.

19. The image taking device according to claim 17, wherein
the recording device records the face information in a face information file different from an image file storing the image data.

20. A control method for image taking in a image taking device comprising a switching device which manually switches a face detecting function to its effective or ineffective position, wherein the face detecting function is made ineffective at the time of turning a power supply on, and when the face detecting function is switched to its effective position after the power supply has been set ON and one or more faces are detected in image data to be photographed, to automatically control at least one of exposure, focus, white balance and picture quality so that the detected faces can be optimally photographed, the control method for image taking comprising the steps of:
detecting whether there exist one or more faces in all image data recorded in a recording medium or in the image data within a predetermined period of time from a latest image data or in a predetermined number of image data selected from the latest image data;
determining a percentage of image data in which there exist one or more faces in all image data detected as to whether there exist the faces; and
providing an instruction on prompting a user to switch the face detecting function to its effective position when a percentage of image data in which there exist one or more faces exceeds a predetermined threshold at the time of turning on the power supply.

21. A control method for image taking, when a face detecting function is switched to its effective position and one or more faces are detected in image data to be photographed, automatically controlling at least one of exposure, focus, white balance and picture quality so that the detected faces can be optimally photographed, the control method for image taking comprising the steps of:
detecting whether there exist one or more faces in all image data recorded in a recording medium or in image data within a predetermined period of time from a latest image data or in the predetermined number of image data selected in reverse chronologic order from the latest image data;
determining the percentage of image data in which there exist one or more faces to all image data detected as to whether there exist the faces; and
making the face detecting function effective when the percentage of image data in which there exist one or more faces exceeds a predetermined threshold at the time of turning on a power supply.

* * * * *